United States Patent
Knox et al.

(10) Patent No.: US 9,110,635 B2
(45) Date of Patent: Aug. 18, 2015

(54) INITIATING PERSONAL ASSISTANT APPLICATION BASED ON EYE TRACKING AND GESTURES

(71) Applicant: Lenovo (Singapore) Pte. Ltd., New Tech Park (SG)

(72) Inventors: Jonathan Gaither Knox, Morrisville, NC (US); Rod D. Waltermann, Rougemont, NC (US); Liang Chen, Raleigh, NC (US); Mark Evan Cohen, Cary, NC (US)

(73) Assignee: Lenova (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/095,235

(22) Filed: Dec. 3, 2013

(65) Prior Publication Data
US 2015/0154001 A1    Jun. 4, 2015

(51) Int. Cl.
| | |
|---|---|
| *G06F 13/00* | (2006.01) |
| *G09G 5/02* | (2006.01) |
| *G06F 3/16* | (2006.01) |
| *G06F 3/00* | (2006.01) |
| *G06F 3/01* | (2006.01) |

(52) U.S. Cl.
CPC ............... *G06F 3/167* (2013.01); *G06F 3/005* (2013.01); *G06F 3/017* (2013.01)

(58) Field of Classification Search
CPC .................................. G06K 9/46; H04N 7/18
USPC ........................................................ 710/62
See application file for complete search history.

(56) References Cited

U.S. PATENT DOCUMENTS

| | | | |
|---|---|---|---|
| 2,510,344 | A | 6/1950 | Law |
| 2,567,654 | A | 9/1951 | Siezen |
| 3,418,426 | A | 12/1968 | Schlegel et al. |
| 3,628,854 | A | 12/1971 | Jampolsky |
| 4,082,433 | A | 4/1978 | Appeldorn et al. |
| 4,190,330 | A | 2/1980 | Berreman |

(Continued)

FOREIGN PATENT DOCUMENTS

| | | |
|---|---|---|
| DE | 10310794 | 9/2004 |
| DE | 69937592 | 10/2008 |

(Continued)

OTHER PUBLICATIONS

Russell Speight Vanblon, Suzanne Marion Beaumont, Rod David Waltermann, "Detecting Pause in Audible Input to Device" related pending U.S. Appl. No. 14/095,369, filed Dec. 3, 2013.

(Continued)

*Primary Examiner* — Titus Wong
(74) *Attorney, Agent, or Firm* — John L. Rogitz; John M. Rogitz

(57) ABSTRACT

A device includes a processor and a memory accessible to the processor. The memory bears instructions executable by the processor to receive at least one signal from at least one camera in communication with the device, determine that a user of the device is looking at least substantially at a personal assistant feature presented on a display of the device at least partially based on the signal, and initiate a personal assistant which processes audible input from the user received at the device in response to a determination that the user is looking at least substantially at the personal assistant feature. The personal assistant is associated with the personal assistant feature.

20 Claims, 4 Drawing Sheets

(56) References Cited

U.S. PATENT DOCUMENTS

| | | | |
|---|---|---|---|
| 4,577,928 A | | 3/1986 | Brown |
| 5,579,037 A | | 11/1996 | Tahara et al. |
| 5,583,702 A | | 12/1996 | Cintra |
| 6,046,847 A | | 4/2000 | Takahashi |
| 2004/0160419 A1 | | 8/2004 | Padgitt |
| 2009/0065578 A1 | | 3/2009 | Peterson et al. |
| 2009/0204410 A1 | | 8/2009 | Mozer et al. |
| 2009/0259349 A1 | | 10/2009 | Golenski |
| 2009/0315740 A1 | * | 12/2009 | Hildreth et al. .................. 341/20 |
| 2010/0079508 A1 | * | 4/2010 | Hodge et al. .................. 345/697 |
| 2010/0171720 A1 | | 7/2010 | Craig et al. |
| 2010/0211918 A1 | * | 8/2010 | Liang et al. .................... 715/863 |
| 2011/0065451 A1 | | 3/2011 | Danado et al. |
| 2012/0149309 A1 | | 6/2012 | Hubner et al. |
| 2012/0220311 A1 | | 8/2012 | Rodriguez et al. |
| 2012/0268268 A1 | | 10/2012 | Bargero |
| 2013/0021459 A1 | * | 1/2013 | Vasilieff et al. ................. 348/77 |
| 2013/0044042 A1 | | 2/2013 | Olsson et al. |
| 2013/0170755 A1 | * | 7/2013 | Dalton et al. ................. 382/195 |
| 2013/0246663 A1 | | 9/2013 | Raveendran et al. |
| 2013/0307771 A1 | * | 11/2013 | Parker et al. .................. 345/158 |
| 2014/0317524 A1 | | 10/2014 | VanBlon et al. |

FOREIGN PATENT DOCUMENTS

| | | |
|---|---|---|
| EP | 0880090 | 11/1998 |
| WO | 2004051392 | 6/2004 |

OTHER PUBLICATIONS iSource: "Raise to Speak Makes Siri Wonderfully Useful (Once You Know How to Use It)", http://isource.com/10/01/raise-to-speak-makes-siri-wonderfully-useful-once-you-know-how-to-use-it./ Web printout Nov. 15, 2013.

Russell Speight Vanblon, Neal Robert Caliendo Jr.; "Automatic Magnification and Selection Confirmation" file history of related U.S. Appl. No. 14/322,119, filed Jul. 2, 2014.

Russell Speight Vanblon, Neal Robert Caliendo Jr.; "Magnification Based on Eye Input" file history of related U.S. Appl. No. 14/546,962, filed Nov. 18, 2014.

Russell Speight Vanblon, Suzanne Marion Beaumont, Rod David Waltermann, "Detecting Pause in Audible Input to Device" file history of related U.S. Appl. No. 14/095,369, filed Dec. 3, 2013.

Suzanne Marion Beaumont, Russell Speight Vanblon, Rod D. Waltermann, "Devices and Methods to Receive Input at a First Device and Present Output in Response on a Second Device Different from the First Device" file history of related U.S. Appl. No. 14/095,093, filed Dec. 3, 2013.

Nathan J. Peterson, John Carl Mese, Russell Speight Vanblon, Arnold S. Weksler, Rod D. Waltermann, Xin Feng, Howard J. Locker, "Systems and Methods to Present Information on Device Based on Eye Tracking" file history of related U.S. Appl. No. 14/132,663, filed Dec. 18, 2013.

Russell Speight Vanblon, Rod David Waltermann, John Carl Mese, Arnold S. Weksler, Nathan J. Peterson, "Detecting Noise or Object Interruption in Audio Video Viewing and Altering Presentation Based Thereon" file history of related U.S. Appl. No. 14/158,990, filed Jan. 20, 2014.

Russell Speight Vanblon, Axel Ramirez Flores, Jennifer Greenwood Zawacki, Alan Ladd Painter, "Skin Mounted Input Device" file history of related U.S. Appl. No. 14/1162,115, filed Jan. 23, 2014.

Axel Ramirez Flores, Rod David Waltermann, James Anthony Hunt, Bruce Douglas Gress, James Alan Lacroix, "Glasses with Fluid-Fillable Membrane for Adjusting Focal Length of One or More Lenses of the Glasses" file history of related U.S. Appl. No. 14/453,024, filed Aug. 6, 2014.

Steven Richard Perrin, Jianbang Zhang, John Weldon, Scott Edwards Kelso, "Initiating Application and Performing Function Based on Input" file history of related U.S. Appl. No. 14/557,628, filed Dec. 2, 2014.

Rod David Waltermann, John Carl Mese, Nathan J. Peterson, Arnold S. Weksler, Russell Speight Vanblon, "Movement of Displayed Element from One Display to Another" file history of related U.S. Appl. No. 14/550,107, filed Nov. 21, 2014.

Amy Leigh Rose, Nathan J. Peterson, John Scott Crowe, Bryan Loyd Young, Jennifer Lee-Baron, "Presentation of Data on an at Least Partially Transparent Display Based on User Focus" file history of related U.S. Appl. No. 14/548,938, filed Nov. 20, 2014.

Wikipedia, "Electromyography", definition; http://en.wikipedia.org/wiki/Electromyogrpahy, printed from website Jan. 27, 2015.

Thalmiclabs, "Myo Gesture Control Armband" http://www.thalmic.com/en/myo, printed from website Jan. 27, 2015.

Tactus Technology, "Taking Touch Screen Interfaces Into a New Dimension", 2012 (13 pages).

Arthur Davis, Frank Kuhnlenz, "Optical Design Using Fresnel Lenses, Basic Principles and some Practical Examples" Optik & Photonik, Dec. 2007.

Superfocus, "See the World in Superfocus Revolutionary Eyeglasses Give You the Power to Focus Your Entire View at Any Distance", http://superfocus.com/eye-care-practitioners, printed from website Jun. 24, 2014.

Darren Quick, "PixelOptics to Launch 'world's first electronic focusing eyewear'", http://www.gizmag.com/pixeloptics-empower-electroni-focusing-glasses/17569/. Jan. 12, 2011.

Insight News, "Electronic-lens company PixelOptics is bankrupt", htttp://www.insightnews.com.au/_blog/NEWS_NOW!/post/lens/electronic-lens-company-pixeloptics-is-bankrupt/. Dec. 12, 2013.

Wikipedia, "Extended Display Identification Data", Definition; http://en.wikipedia.org/wiki/Extended_display_Identification_data, printed from website Oct. 10, 2014.

Extron, "Digital Connection, Understanding EDID—Extended Display Identification Data", Fall 2009, www.extron.com.

"Relationship Between Inches, Picas, Points, Pitch, and Twips", Article ID: 76388; http://support2.microsoft.com/KB/76388. Printed Oct. 10, 2014.

Wikipedia, "Polarizer" Definition; http://en.wikipedia.org/wiki/Polarizer, printed from website Jan. 14, 2015.

Wikepedia, "Smart Glass" Definition, http://en.wikipedia.org/wiki/Smart_glass, printed from website Jan. 14, 2015.

Wikipedia, "Microphone array", definition, http://en.wikipedia.org/wiki/Microphone_array, printed from website Jan. 22, 2015.

Wikipedia, "Beamforning", definition; http://en.wikipedia.org/wiki/Beamforming, printed from website Jan. 22, 2015.

"Understanding & Using Directional Microphones", http://www.soundonsound.com/sos/sep00/articles/direction.htm; Published in SOS Sep. 2000.

Wikipedia, "Microphone", definition; http://en.wilipedia.org/wkik/microphone, printed from website Jan. 22, 2015.

Thalmiclabs, "Myo-Tech Specs", http://www.thalmic.com/en/myo/techspecs, printed from website Jan. 27, 2015.

* cited by examiner

INITIATING PERSONAL ASSISTANT APPLICATION BASED ON EYE TRACKING AND GESTURES

FIELD

The present application relates generally to initiating a personal assistant application of a device.

BACKGROUND

Currently, computing devices are prone to error when a user provides input to initiate an application of the device because the input is often indeterminate to the device. Furthermore, when providing an audible input sequence such as a command to a device, a user sometimes becomes distracted and, while the user may still be speaking, the user is not intentionally providing input to the device but e.g. speaking to another person. However, the device continues to detect and process audio from the user when the user is speaking to the other person and not to the device, leading to unintentional input to the device and even e.g. execution of undesired commands. In such instances, a user may e.g. be required to provide the desired input to the device again (including e.g. previously input portions) in a new sequence, which can be burdensome.

SUMMARY

Accordingly, in a first aspect a device includes a processor and a memory accessible to the processor. The memory bears instructions executable by the processor to receive at least one signal from at least one camera in communication with the device, determine that a user of the device is looking at least substantially at an assistant feature presented on a display of the device at least partially based on the signal, and initiate an assistant which processes audible input from the user received at the device in response to a determination that the user is looking at least substantially at the assistant feature, where the assistant is associated with the assistant feature.

In some embodiments, the instructions may be further executable by the processor to receive audible input from the user. Also in some embodiments, the instructions may be further executable by the processor to execute a function on the device which is executed in response to receipt of the audible input and in response to processing a command derived from the audible input, where the command may be derived from the audible input at least in part using the assistant. Further still, if desired the function may be to initiate an application other than the assistant on the device.

Additionally, if desired the determination that the user is looking at least substantially at the assistant feature may include a determination that the user is looking at the assistant feature. Also in some embodiments, the assistant may be initiated in response to at least the determination that the user is looking at the assistant feature and also one or both of a determination that the user's current facial expression is indicative of being at least about to provide audible input and/or a determination that the user is performing a predefined gesture detectable by the device In some embodiments, the determination that the user's current facial expression is indicative of being at least about to provide audible input may include a determination that the user's mouth is at least partially open. The predefined gesture may include pointing at or toward the device, and/or may be defined by a user prior to looking at the assistant feature.

In another aspect, a method includes receiving at least a first signal from at least one camera in communication with a device, determining that a user of the device is looking at least substantially at the device at least partially based on the first signal, and initiating a personal assistant application in response to determining that the user is looking at least substantially at the device and also in response to determining that the user is speaking. The personal assistant application is understood to execute a command in response to processing audible input from the user.

In still another aspect, an apparatus includes a first processor, a network adapter, and storage bearing instructions for execution by a second processor for processing an audible input command provided by a user of a device associated with the second processor and executing the audible input command. The device processes the audible input command responsive to a determination based on at least one signal from at least one camera in communication with the device that the user is gesturing a predefined gesture. Further, the first processor transfers the instructions over the network via the network adapter to the device.

The details of present principles, both as to their structure and operation, can best be understood in reference to the accompanying drawings, in which like reference numerals refer to like parts, and in which:

DETAILED DESCRIPTION

Figure 1:
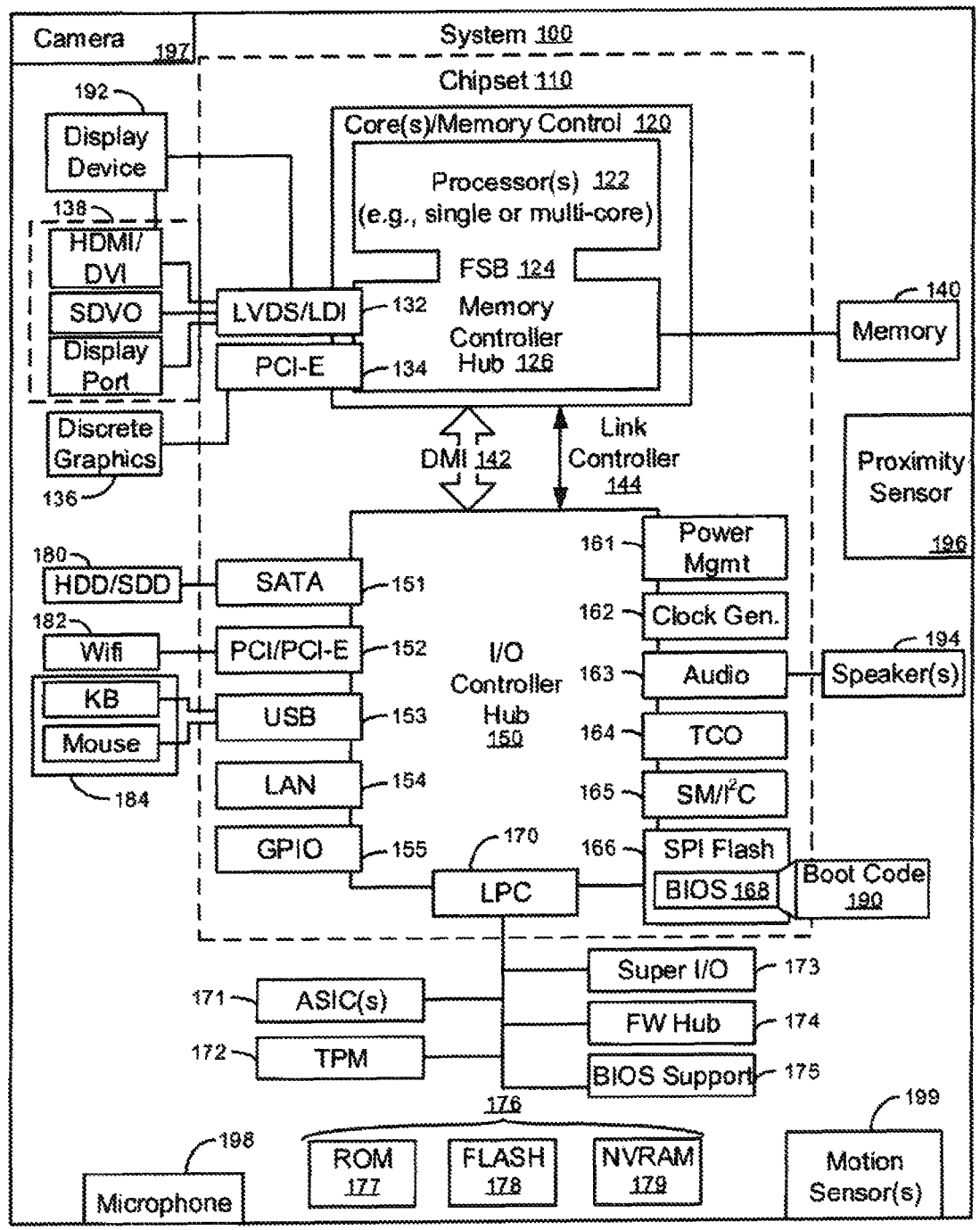
FIG. 1 is a block diagram of an exemplary device in accordance with present principles.

This disclosure relates generally to (e.g. consumer electronics (CE)) device based user information. With respect to any computer systems discussed herein, a system may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various subroutines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an exemplary block diagram of a computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDM/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 also may include a proximity, infrared, sonar, and/or heat sensor 196 providing input to the processor 122 and configured in accordance with present principles for sensing e.g. body heat of a person and/or the proximity of at least a portion of the person to at least a portion of the system 100 such as the sensor 196 itself. Also in some embodiments, the system 100 may include one or more cameras 197 providing input to the processor 122. The camera 197 may be, e.g., a thermal imaging camera, a digital camera such as a webcam, and/or a camera integrated into the system 100 and controllable by the processor 122 to gather pictures/images and/or video in accordance with present principles (e.g. to gather one or more images of a user's face, mouth, eyes, etc.). Moreover, the system 100 may include an audio receiver/microphone 198 for e.g. entering audible input such as a command and/or an audible input sequence to the system 100 to control the system 100 and/or cause the system to undertake a function (e.g. launch an application such as an Internet browser). The system 100 may include one or more motion sensors 199 (such as e.g., an accelerometer and/or a gesture sensor (e.g. for sensing gestures in free space associated by the device with commands in accordance with present principles), etc.) providing input to the processor 122 in accordance with present principles.

Figure 2:
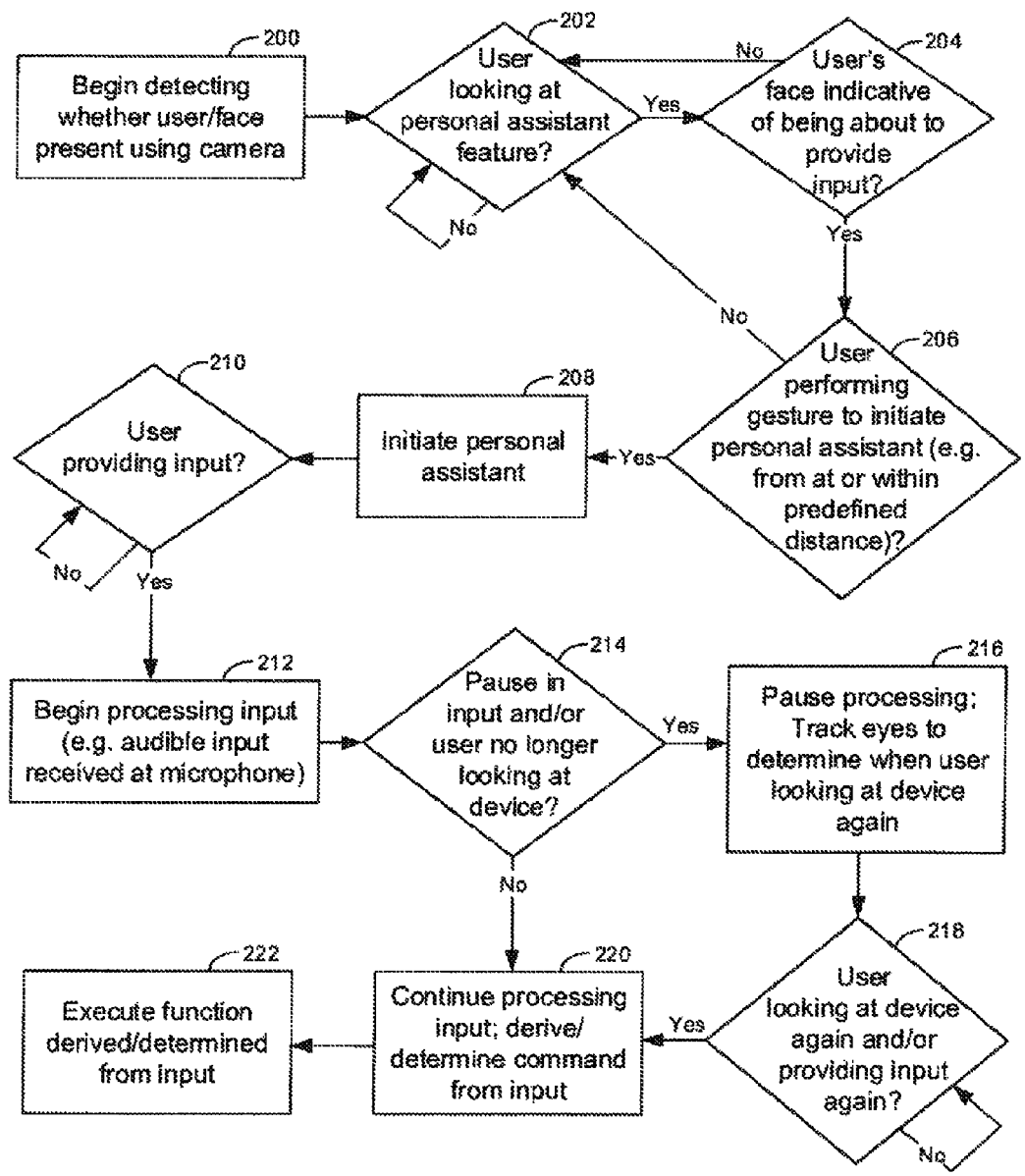
FIG. 2 is an example flowchart of logic to be executed by a device in accordance with present principles.

Before moving on to FIG. 2 and as described herein, it is to be understood that an exemplary device or other machine/computer may include fewer or more features than shown on the system 100 of FIG. 1. In any case, it is to be understood at least based on the foregoing that the system 100 is configured to undertake present principles (e.g. receive audible input from a user, store and execute and/or undertake the logic described below, and/or perform any other functions and/or operations described herein).

Now in reference to FIG. 2, an example flowchart of logic to be executed by a device such as the system 100 described above (e.g. such a device undertaking the logic of FIG. 2 referred to in reference to FIG. 2 as "the device") in accordance with present principles is shown. Beginning at block 200, the logic begins detecting (e.g. using a camera in communication with and/or on the device) whether a user and even more specifically a user's face is present. In some embodiments at block 200, the logic begins detecting whether a user and/or the user's face is not only present but within a predefined and/or threshold distance from the device before moving on from block 200.

After block 200, the logic proceeds to decision diamond 202 where the logic determines (e.g. based on input from the camera) whether the detected user is looking at least substantially at a personal assistant feature (e.g. a personal assistant icon) associated with a personal assistant application and presented on a display of the device e.g. to initiate the personal assistant feature. In some embodiments, the logic may determine not just that the user is looking at the feature but that the user is looking at the feature for e.g. at least a threshold time to reach an affirmative determination as will be described shortly, thereby declining to process e.g. glances at the device by the user that were not meant to be input to the device.

In any case, determining whether the user is looking at least substantially at the personal assistant feature may include determining whether the user is e.g. looking around and/or toward the device based on an image from a camera in communication with the device and applying eye tracking software to the image, looking (e.g. directly) at the personal assistant feature based on an image from a camera in communication with the device and applying eye tracking software to the image, and/or looking within a threshold number of degrees of looking at the personal assistant feature relative to e.g. a vector established by the user's actual line of sight toward the device relative to the the personal assistant feature presented on the device based on an image from a camera in communication with the device and applying eye tracking software to the image. But regardless, an affirmative determination based on one or more of the foregoing at diamond 202 causes the logic to proceed to decision diamond 204, but a negative determination at diamond 202 causes the logic to continue making the determination of diamond 202 until an affirmative determination is made.

At diamond 204, the logic determines whether a current or at least substantially current facial expression of the user (e.g. based on real-time images and/or data from the camera, and/or execution facial expression software and/or lip reading software on such an image(s)) is indicative of being at least about to provide audible input to the personal assistant application associated with the personal assistant feature. In some embodiments, the logic may determine the current facial expression is indicative of being at least about to provide audible input based on a determination that the user's mouth is at least partially open (e.g. based on an image and/or data from the camera and e.g. executing lip reading software on the image/data) but e.g. immobile and/or still (e.g. for at least a threshold time that may in some embodiments be less than one second). If a negative determination is made at diamond 204, the logic reverts back to diamond 202 and proceeds therefrom. If an affirmative determination is made at diamond 204, the logic instead proceeds to decision diamond 206.

At diamond 206 the logic determines whether the user is performing a predefined gesture in free space e.g. detectable using the camera and/or gesture recognition software and determined by the logic (e.g. by accessing a data table correlating particular gestures with respective commands and/or functions for the device to undertake and matching the received gesture to a gesture in the table to thus determine an associated command) as being input to the device (e.g. a command) to initiate the personal assistant. In some embodiments, the logic may even determine whether the gesture is performed within a predefined distance from the device (e.g. using a proximity sensor as described above in reference to FIG. 1 to sense the proximity of the at least a portion of the user to the device), where responsive to determining that the gesture is performed within the predefined distance the logic executes the command and/or function associated with the gesture, and responsive to determining that the gesture is not performed within the predefined distance the logic declines to execute the command and/or function associated with the gesture. Also in some embodiments, the predefined gesture can include pointing at or toward the device, nodding the users head e.g. up and toward the device (e.g. to mimic a typical "what's up" gesture), and/or pointing at the personal assistant feature. In any case, it is to be further understood that the predefined gesture may defined by a user prior to looking at the personal assistant feature to initiate it, and/or may be defined by the provider of the personal assistant application (e.g. a server from which the personal assistant application is downloaded, and/or the creator of the personal assistant application).

In any case, a negative determination at diamond 206 causes the logic to revert back to diamond 202. An affirmative determination at diamond 206 causes the logic to proceed to block 208, where the logic initiates the personal assistant application to process audible input (e.g. a command) from the user received at the device. The logic then proceeds to decision diamond 210 where the logic determines whether the user is providing (e.g. audible) input to the device and more specifically to the personal assistant application (e.g. based on audio sensed by a microphone of the device, voice recognition software, audible input processing software, and/or eye tracking software to determine the user is looking at the personal assistant). If a negative determination is made at diamond 210, the logic continues making the determination at diamond 210 until an affirmative determination is made. Once an affirmative determination is made at diamond 210, the logic proceeds to block 212 where logic begins processing user input to the device, such as e.g. audible user input to the device received by the device through a microphone such as the microphone 198 disclosed above.

Still in reference to FIG. 2, after block 212 the logic moves to decision diamond 214 where the logic determines whether a pause in user input has occurred (e.g. an audible pause in the audible input as determined by the lack of audio received at the microphone; and/or a pause in the movement of the user's lips as determined based on data and/or images from the camera of the device, lip reading/movement software, and/or facial expression software) and/or whether the user is no longer looking e.g. at, around, or toward the device (e.g. based on data and/or images from the camera of the device and/or eye tracking software). If a negative determination is made at diamond 214, the logic proceeds to block 220, which will be described shortly. However, if an affirmative determination is made at diamond 214, the logic moves to block 216 where the logic pauses and/or ceases processing of the audible input (e.g. an audible input sequence) and/or processing of a command being derived therefrom. Also at block 216, the logic tracks the user's eyes in accordance with present principles to determine at decision diamond 218 whether and/or when the user again looks e.g. at, around, or toward the device, and/or whether the user resumes providing (e.g. audible) input for e.g. at least a threshold time (e.g. as determined in accordance with present principles that the user's lips are moving based on data and/or images from the camera, and/or as determined in accordance with present principles the audible input is being provided based on the audible input being received at the microphone).

A negative determination at diamond 218 causes the logic to continue making the determination at diamond 218 until an affirmative determination is made. Upon an affirmative determination at diamond 218, the logic proceeds to block 220. At block 200, the logic continues processing input that is received and/or executing a command being derived from the input being received. The logic may then conclude at block 222 where the logic executes a function derived from and/or determined based on the input and/or command. It is to be understood that in non-limiting embodiments the function may be to e.g. launch and/or initiate an application other than the personal assistant on the device such as e.g. an Internet browser, a function to contact another person and/or device (e.g. call another person, send an email to another person, etc.).

Figure 3:
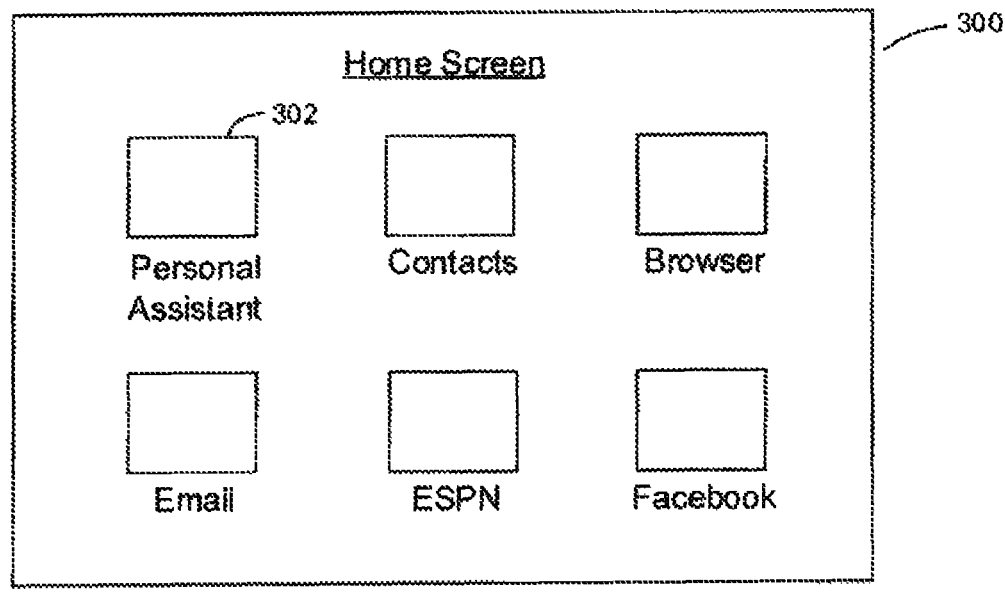
FIGS. 3-6 are example user interfaces (UIs) presentable on a device in accordance with present principles.

Continuing the detailed description now in reference to FIG. 3, it shows an exemplary home screen user interface (UI) 300 for a device in accordance with present principles. The UI 300 includes plural icons associated with respective applications such as e.g. an email icon for an email application, a browser icon for a browser application, etc.

Note that the UI 300 also includes a personal assistant icon 302 selectable to e.g. automatically without further user input responsive thereto launch and/or initiate a personal assistant application in accordance with present principles. Thus, in exemplary embodiments the personal assistant application may be launched e.g. by sensing that the user is looking at the icon 302 using a camera on the device and/or eye tracking software that track the user's eyes, and/or based on a determination that e.g. the user is inputting a predefined gesture as detected using the camera. The personal assistant application being launched, the user may then begin entering an audible input sequence such as a command, and thus a UI 400 as shown in FIG. 4 may be presented while the user is providing input.

Figure 4:
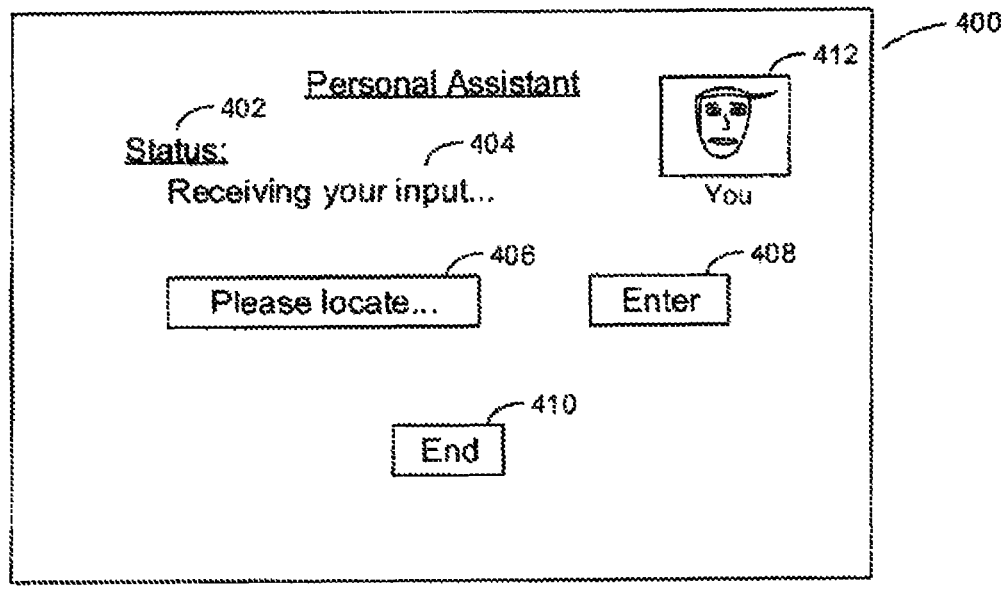

As may be appreciated from FIG. 4, the UI 400 may include a status indicator 402 and associated text 404, where the text 404 indicates e.g. that the device and/or audible input application is receiving input from the user (e.g. audible input, gestural input, input from a keypad, etc.). Thus, a text box/input box 406 (e.g. reflecting and/or representing the input from the user) may indicate the input from the user and e.g. may automatically update the indication (e.g. in real time) as input is provided so that a user may see the input as received by the device. Though it is to be understood that the personal assistant may automatically determine that a sequence and/or command has been completely provided (e.g. by determining that a particular word in context is the last word of the sequence and/or processing a word (e.g. a keyword) which the device is programmed to determine as being an ending and/or concluding word for a sequence), it so to be understood that e.g. the device using input from the camera may track the user's eyes to determine that the user is looking at an enter selector element 408 and hence may determine responsive thereto (and/or responsive to additional input from the user such as a gesture pointing at the element 408 to select it and/or input from the user such as e.g. pressing a space bar key (e.g. and/or another predefined key used for selection of an element in conjunction with looking at the element) on a keyboard while looking at the element 408 to select it) that the user has concluded providing the audible input sequence and that the device should process and/or undertake the command sequence that has been received. Likewise, the device is understood to be able to detect, using input from the camera, whether and/or when the user is looking at an end selector element 410 and hence may determine responsive thereto (and/or responsive to additional input from the user such as a gesture pointing at the element 410 to select it and/or input from the user such as e.g. pressing a space bar key (e.g. and/or another predefined key used for selection of an element in conjunction with looking at the element) on a keyboard while looking at the element 410 to select it) that the user desires to end processing of the audible input sequence even if e.g. not complete and/or a command derived therefrom has not been fully executed. However, note that in addition to (e.g. by being combined with the foregoing to undertake the respective function responsive to all three input types being present) or in lieu of the foregoing, the elements 408 and 410 may be selected using touch input to a touch-enabled display screen presenting the UI 400.

Figure 5:
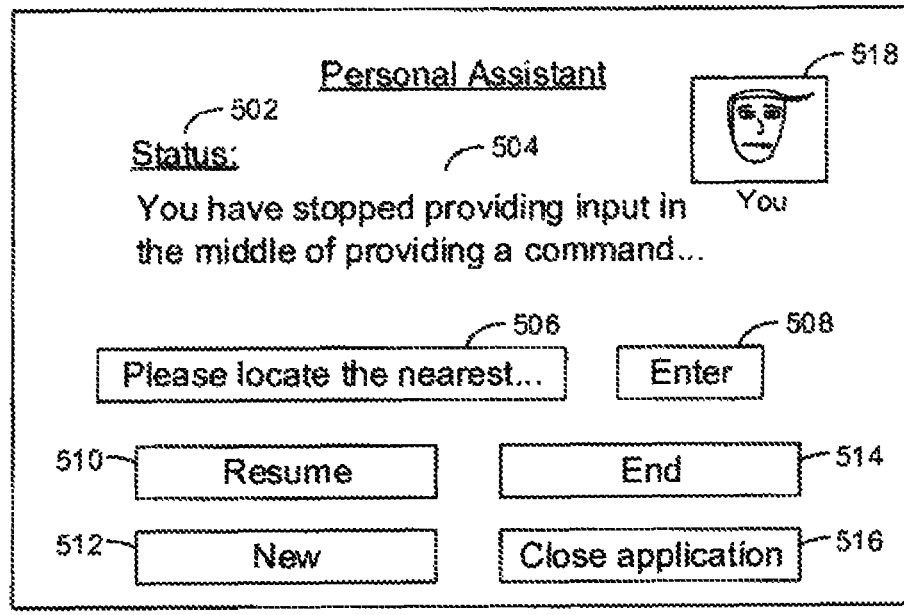

Before moving on to FIG. 5, note that the UI 400 also includes an exemplary image 412 of the user as e.g. gathered by a camera on and/or in communication with the device presenting the UI 400. The image 412 may be e.g. a current image that is updated at regular intervals (e.g. every tenth of a second) as new images of the user are gathered by the camera and thus may be an at least substantially real time image of the user. Note that in the image 412, the user's mouth is open which may be determined by the device (e.g. by executing lip reading software on the image) that audible input is being provided. Furthermore, in some embodiments responsive to plural images of the user being received from the camera, the device may determine that the user's mouth position changes from one image to the next, and hence it may be determined that the user's mouth is moving. In turn, the device may determine that the user is providing audible input to the device by speaking (e.g. while looking at the device).

Turning now to FIG. 5, an exemplary UI 500 is shown that may be presented on the device responsive to a determination that a pause in an input sequence to the device has occurred or is occurring. A status indicator 502 is thus shown with associated text 504 indicating that the device has determined that the user has ceased providing (e.g. audible) input to the device and that e.g. the sequence that was being provided by the user is incomplete. Thus, a text box/input box 506 (e.g. reflecting and/or representing the input from the user) may indicate the incomplete input from the user. An enter selector element 508 associated with the box 506 is also shown and may be substantially similar in function and configuration to the box 406 (e.g. in that it may be selected to provide input that the device should process and/or undertake the command that has been received).

As may be further appreciated from FIG. 5, the UI 500 may include the following selector elements that are respectively selectable to automatically e.g. without further user input responsive to their selection (e.g. selectable by detecting a user's eye gaze in accordance with present principles, a gesture in accordance with present principles, and/or touch in put in accordance with present principles) execute a function associated with the element: a resume selector element 510 for the device to resume detecting, processing, and/or executing previously input but incomplete commands and/or audible input, a new selector element 512 for the device to begin detecting, processing, and/or executing a new command and/or audible input, an end selector element 514 for the device to end processing of the audible input and/or command even if incomplete, and a close application selector element 516 for the device to close the application.

Note further that an exemplary image 518 of the user as e.g. gathered by a camera on and/or in communication with the device is also shown that may be e.g. a current image that is updated at regular intervals as set forth above. However, note that in the present instance, the user's mouth as shown on the image 518 is closed, and hence responsive to the device executing e.g. lip reading software on the image 518 the device may determine that the user's mouth is no longer moving and hence the user has stopped providing (e.g. audible) input.

Figure 6:
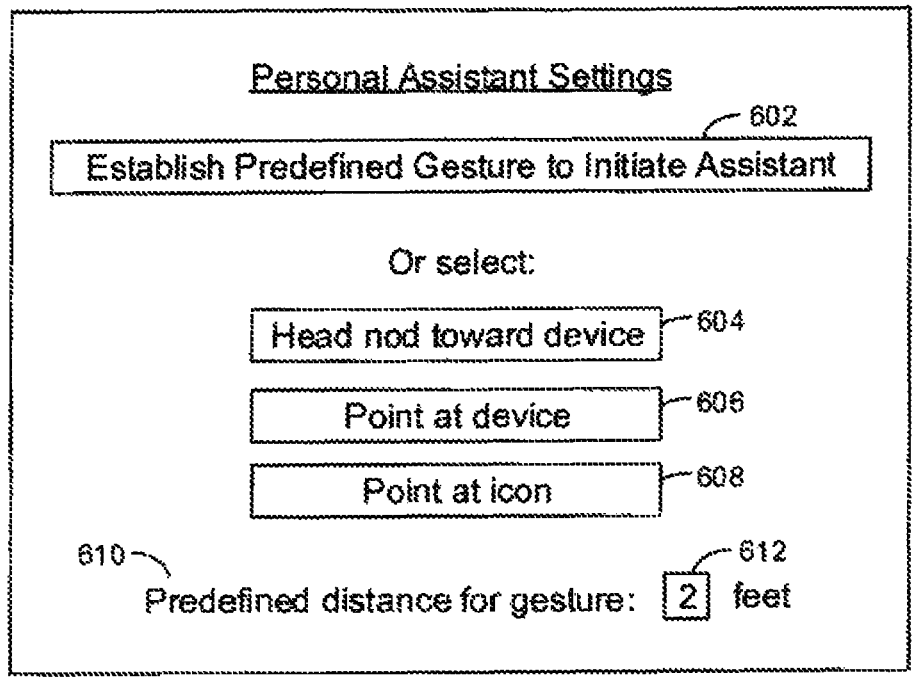

Now in reference to FIG. 6, a settings UI 600 is shown, which may be e.g. incorporated into a general device settings UI and/or presented as a separate settings UI for the audible input application. In any case, the UI 600 includes a selector element 602 selectable by one or more of the methods described herein (e.g. using a gesture, looking at the element, and/or providing touch input to a portion of a touch-enabled display presenting the element) to cause the device to detect a subsequent user input of the gesture which the device is to associate with being a command to initiate an audible input application in accordance with present principles when the user is also e.g. looking at a personal assistant feature such as the icon 302 described above.

The UI 600 also includes plural predefined gesture options for the user to select to similarly cause the device to detect a subsequent user-input of the gesture associated with the elements to be shortly described, which the device will associate with being a command to initiate an audible input application in accordance with present principles when the user is also e.g. looking at a personal assistant feature such as the icon 302 described above. Thus, such elements may include e.g. a head nod toward device selector element 604 for a gesture in which the user nods the user's head up and toward the device, a point at device selector element 606 for a gesture in which the user points at the device, and a point at icon selector element 608 for a gesture in which the user points at a particular icon presented on a display of the device. In addition to the foregoing, the UI 600 may include a threshold distance for gesture setting 610 along with a box 612 for a user to input e.g. a desired distance that a gesture should be performed at or within relative to the device for the device to execute a command associated with the gesture.

Without reference to any particular figure, it is to be understood that in addition to the foregoing types of user input to initiate an application and/or select a selector element, e.g. an audible key word may be input by the user which is recognized by the device as a key word to undertake a certain function.

Also without reference to any particular figure, e.g. assume a user begins providing an audible input sequence in accordance with present principles, pauses providing the sequence to engage another operation of the device, and then determines that the context of a previously input portion of the sequence should be changed upon resumption of providing audible input to be processed. In such an instance, even though the device may have begun "responding" to the input in that it has previously begun to e.g. process a command associated therewith, the device may e.g. recognize an instruction from the user indicating that the previous input was erroneous and/or that the command will be changed at least in part. Furthermore, in some embodiments the device may e.g. upon a determination that a user's eye gaze (which e.g. during the pause was not directed at or toward the device)

has returned to being directed toward the device and also e.g. upon the user resuming providing audible input may also determine that at least a portion of the subsequent input after resumption conflicts and/or is incompatible (e.g. for a unitary or coherent command) with input provided before the pause. In such an instance, the device may e.g. make a determination to resolve the conflict by executing the command as modified by input after the pause and discard the incompatible portion provided before the user's pause.

It may now be appreciated that facial detection software, gaze and/or eye tracking software, gesture tracking software, keyword recognition, and/or touch input to a display may be used in accordance with present principles to determine when a user is engaging with an audible input application such as e.g. a personal assistant of a device. The personal assistant may thus e.g. actively "listen" and/or "look" for input such as a request for information or for the device to undertake a function such as e.g. launching another application, providing information to the user, etc.

Furthermore, when the personal assistant detects that the user is distracted before a request is completely input and/or processed, the personal assistant may pause and then resume processing the input when the user's gaze as detected by a camera on the device returns to the device. If the user is not engaged with the device, then extra input such as e.g. speaking, gesturing, typing, etc. may be ignored and/or treated as spurious data.

Before concluding the detailed description, it is to be understood that although e.g. an audible input application in accordance with present principles may be vended with a device, present principles apply in instances where the audible input application is e.g. downloaded from a server to a device over a network such as the Internet.

While the particular INITIATING PERSONAL ASSISTANT APPLICATION BASED ON EYE TRACKING AND GESTURES is herein shown and described in detail, it is to be understood that the subject matter which is encompassed by the present application is limited only by the claims.

What is claimed is:

1. A device, comprising:
    a processor;
    a memory accessible to the processor and bearing instructions executable by the processor to:
    receive at least one signal from at least one camera in communication with the device;
    at least partially based on the signal, determine that a user is looking at least substantially at a display;
    in response to a determination that the user looks at least substantially at the display, determine whether the user looks at the display for a period satisfying a threshold;
    in response to a determination that the user looks at the display for a period satisfying the threshold, execute at least a first computer process; and
    in response to a determination that the user looks at the display for a period not satisfying the threshold, not execute the first computer process.

2. The device of claim 1, wherein the instructions are further executable by the processor to receive audible input from the user.

3. The device of claim 2, wherein the instructions are further executable by the processor to execute a function on the device which is executed in response to receipt of the audible input and in response to processing a command derived from the audible input, the command being derived from the audible input at least in part using an assistant that is at least part of the first computer process.

4. The device of claim 1, wherein the determination that the user is looking at least substantially at the display includes a determination that the user is looking at a feature presented on the display.

5. The device of claim 1, wherein the determination that the user is looking at least substantially at the display includes a determination that the user is looking at a feature presented on the display, and wherein the first computer process is initiated in response to at least both of the determination that the user is looking at the feature and a determination that the user's current facial expression is indicative of being at least about to provide audible input.

6. The device of claim 1, wherein the first computer process is executed responsive to a determination that the user gestures a predefined gesture defined by a person prior to the looking at the display.

7. A method, comprising:
    receiving at least a first signal from at least one camera in communication with a device;
    at least partially based on the first signal, determining whether a user is looking at least substantially at the device for at least a threshold amount of time;
    in response to determining that the user is looking at least substantially at the device for at least the threshold amount of time, initiating a personal assistant application, wherein the personal assistant application executes a command in response to processing audible input from the user; and
    in response to determining that the user is looking at least substantially at the device but not for the threshold amount of time, not initiating the personal assistant application.

8. The method of claim 7, wherein determining that the user is looking at least substantially at the device for at least the threshold amount of time includes determining that the user is looking at a personal assistant icon presented on a display of the device for at least the threshold amount of time, wherein the personal assistant icon is selectable to initiate the personal assistant.

9. The method of claim 7, further comprising:
    controlling the personal assistant application to begin executing a command in response to audible input received at the device;
    determining that the user has stopped speaking at least partially based on a second signal from the camera;
    responsive to determining that the user has stopped speaking, ceasing to execute the command;
    determining that the user has resumed speaking based at least partially based on a third signal from the camera; and
    responsive to determining that the user has resumed speaking, continuing to execute the command.

10. The method of claim 7, further comprising:
    controlling the personal assistant application to begin executing a command in response to audible input received at the device;
    determining that the user is no longer looking at least substantially at the device;
    receiving additional audible input at the device; and
    in response to determining that the user is no longer looking at least substantially at the device and in response to receiving the audible input, declining to process the additional audible input as part of the command.

11. The method of claim 7, further comprising:
    at least partially based on the first signal, determining that the user is speaking, wherein the determining that the user is speaking is executed by the device responsive to executing facial expression software on a facial expression of the user from an image gathered by the camera.

12. An apparatus, comprising:
a first processor;
a network adapter;
storage bearing instructions executable by a second processor for:
processing an audible input command at a device associated with the second processor, the processing of the audible input command being responsive to a determination based on at least one signal from at least one camera in communication with the device that a user is gesturing a first predefined gesture; and
presenting a user interface (UI) on the device associated with the second processor, the UI indicating plural predefined gestures;
receiving a selection of at least one of the predefined gestures; and
establishing the first predefined gesture at least in part based on the selection;
wherein the first processor transfers the instructions over a network via the network adapter.

13. The device of claim 1, wherein the first computer process is executed responsive to a determination that the user gestures a predefined gesture which includes pointing at the device.

14. The method of claim 7, wherein the determining that a user is looking at least substantially at the device for at least the threshold amount of time comprises determining that the user is looking at least substantially at a personal assistant icon presented on the device that is associated with the personal assistant application, and wherein the determining that the user is looking at least substantially at the personal assistant icon is at least in part based on identifying at the device a vector established by the user's actual line of sight toward the device as being within a threshold number of degrees of looking directly at at least a portion of the personal assistant icon.

15. The apparatus of claim 12, wherein the instructions are executable by the processor to initiate processing the audible input command further responsive to determining that the user is gesturing a predefined gesture and responsive to determining that the predefined gesture is gestured by the user from within a threshold distance of the device, wherein the threshold distance is less than a maximum distance from the device at which gestures are identifiable by the device, wherein the threshold distance is defined by a user, and wherein the determining that the predefined gesture is gestured by the user from within the threshold distance of the device is based at least in part on input from a sensor which senses body heat.

16. The apparatus of claim 12, wherein the instructions are executable by the processor to initiate processing the audible input command further responsive to determining that the user is gesturing a predefined gesture comprising a head nod, the head nod comprising movement of the user's head.

17. The apparatus of claim 12, wherein the instructions are executable by the processor to initiate processing the audible input command further responsive to determining that the user is gesturing a predefined gesture, wherein the predefined gesture is established at least in part based on first input from a person, the first input detected by the device prior to the processing of the audible input command, the first input comprising the person performing a gesture.

18. The apparatus of claim 12, wherein the instructions are executable for receiving the selection of the at least one of the predefined gestures based at least in part on receipt of input from the at least one camera used to determine that the user is looking at least substantially at one of the indications, and based at least in part on receipt of input from a keyboard corresponding to selection of at least one key from the keyboard at at least one time during which the user is looking at least substantially at the one of the indications.

19. The apparatus of claim 12, wherein the UI includes a selector element selectable to initiate a computer process in which the device at least attempts to detect performance of a particular gesture which the device is to establish as being the first predefined gesture.

20. The apparatus of claim 19, wherein upon initiation of the computer process, the device detects user input of the particular gesture and establishes the particular gesture as being the first predefined gesture.

* * * * *